Sept. 19, 1950      A. J. TACCHELLA      2,522,648
AUTOMATIC CONTROL FOR THE FREEZING OF ICE CREAM
Filed Aug. 13, 1945      3 Sheets-Sheet 1
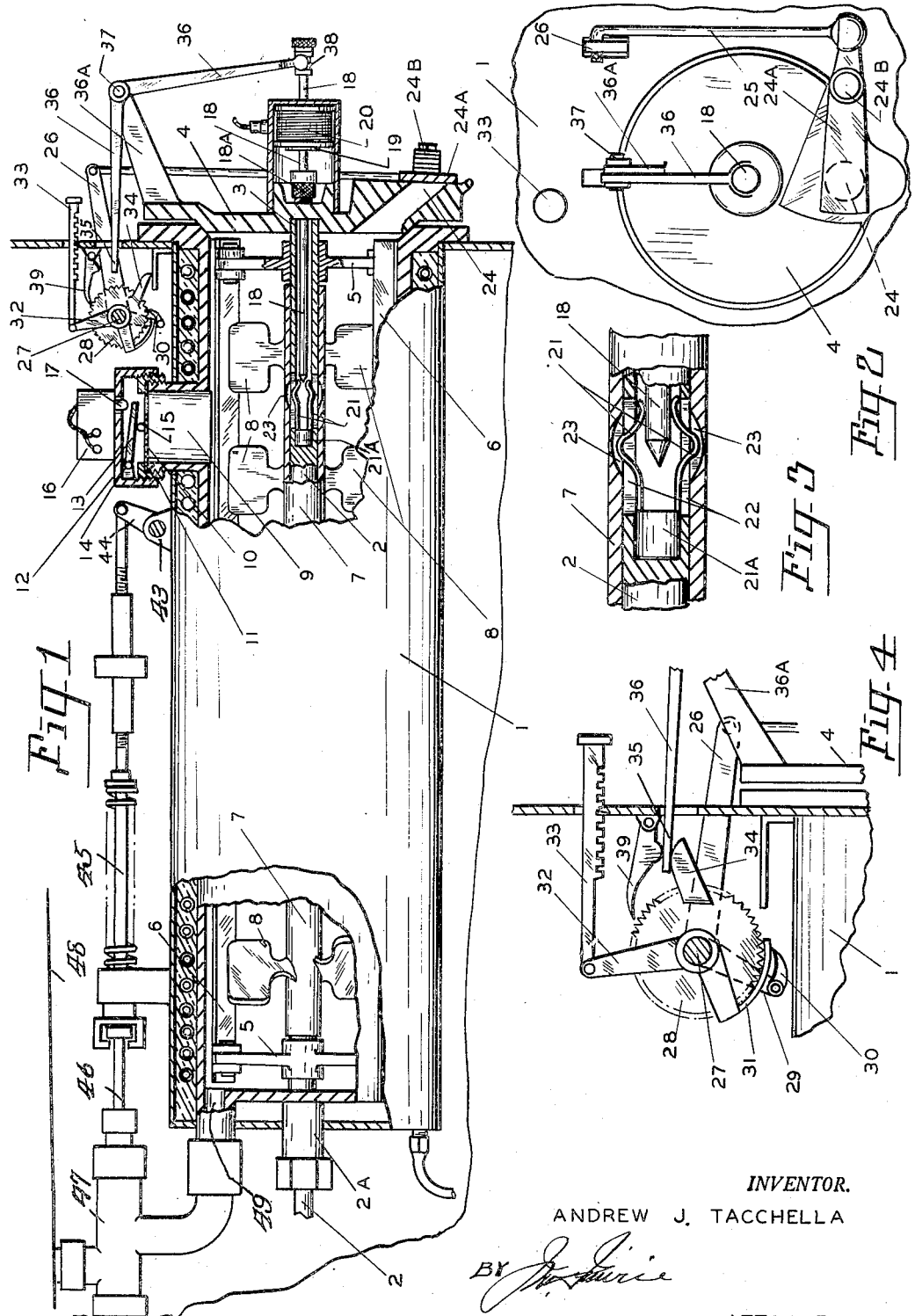
INVENTOR.
ANDREW J. TACCHELLA
BY
ATTORNEY

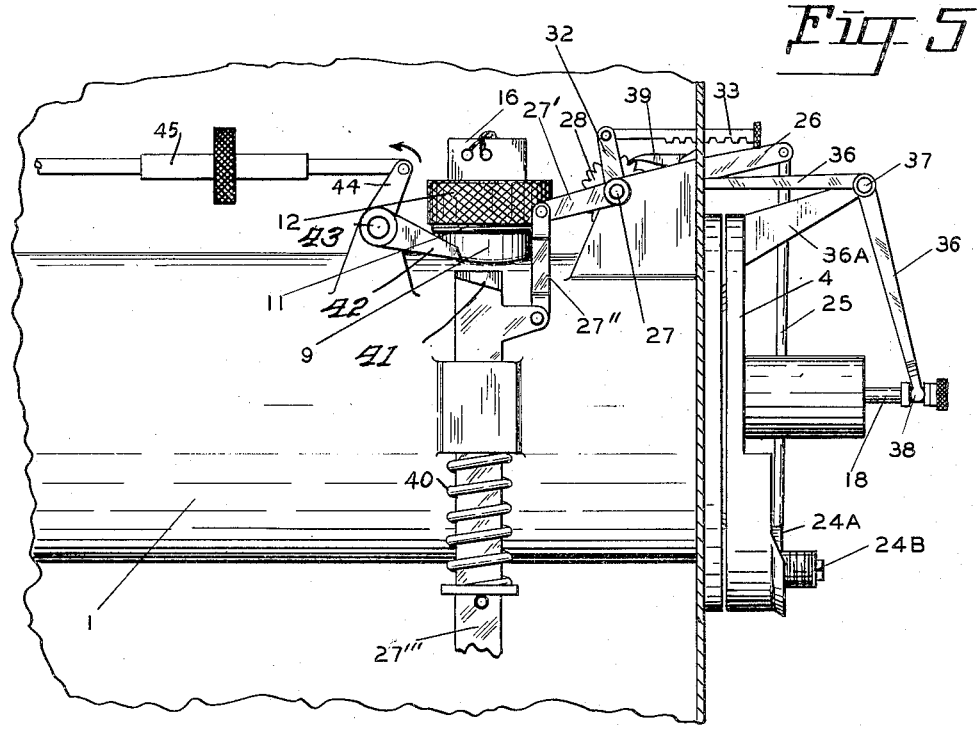
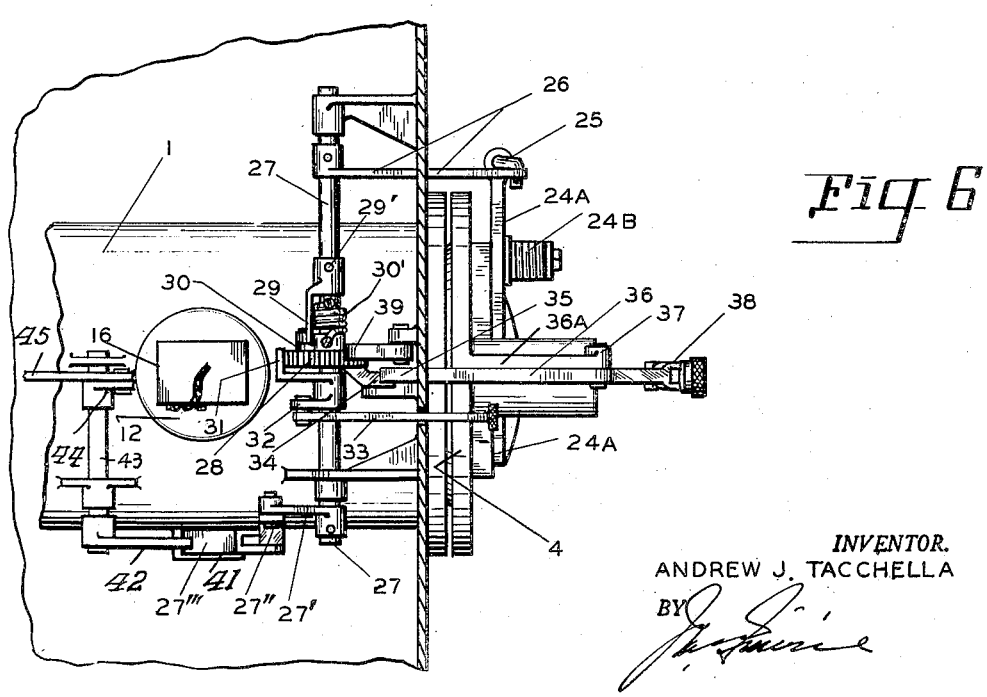

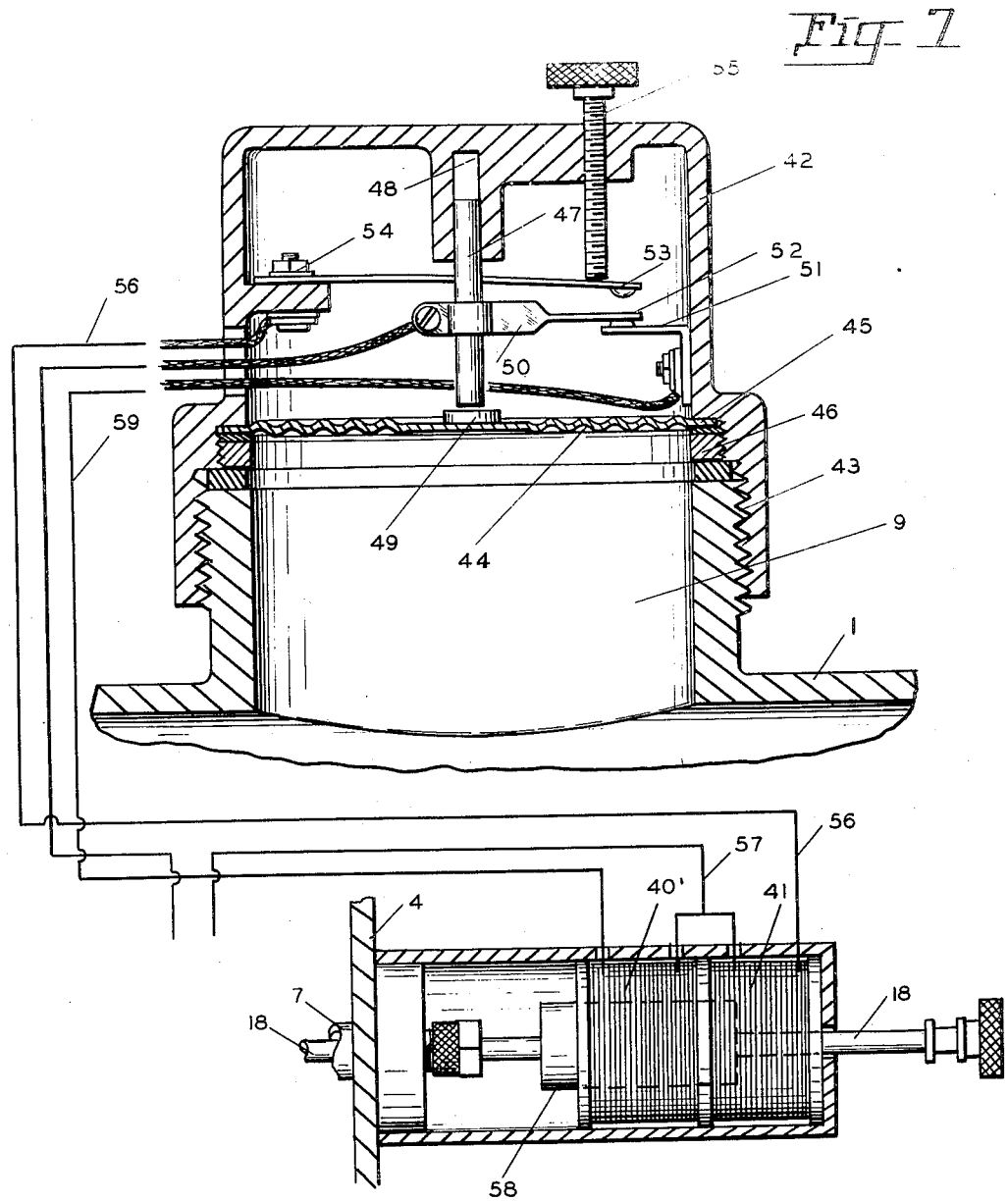

Patented Sept. 19, 1950

2,522,648

UNITED STATES PATENT OFFICE 2,522,648

AUTOMATIC CONTROL FOR THE FREEZING OF ICE CREAM

Andrew J. Tacchella, Portland, Oreg., assignor to Steady-Flow Freezer Co., Portland, Oreg., a corporation of Oregon Application August 13, 1945, Serial No. 610,417

17 Claims. (Cl. 62—2)

This invention relates to over-run or swell controls for ice cream freezers and the like.

The primary object of this invention is to control the over-run or swelling of ice cream while being frozen, bringing the product to a predetermined desired consistency. This is accomplished in my invention by controlling the operation of the whipping or paddle element within an ice cream freezer, stopping the operation of this element when the product has reached a predetermined over-run or swell. This whipping or paddling element will start the swelling action when the swell has been reduced to a predetermined over-run or swell when the control is being used with a continuous operating type of freezer, similar to the one that I have illustrated in my drawings.

In the operation of batch freezing, my new and improved over-run and swell control operates until a predetermined and desired over-run or swell has been attained, and then throws the whipping or paddling element out of operation until all of the ice cream has been withdrawn from the freezer.

The difference between a continuous freezing operation and batch freezing operation is that in the continuous freezing operation the over-run or swell is halted when a predetermined consistency has been reached and then resumed when the over-run has fallen due to withdrawing a portion of the product from the freezer, at which time the whipping or paddling operation is again started.

In the batch freezing the whip or paddle action operates until the cream reaches the desired over-run or consistency at which time the control stops the whipping action. The whipping action does not again resume until the cream has been removed and a new batch of liquid mix poured into the freezer.

These and other incidental objects will be apparent in the drawings, specifications and claims.

Referring to the drawings:

Figure 1 is a fragmentary side elevation of an ice cream freezing unit of the continuous operating principle, parts broken away for convenience of illustration.

Figure 2 is a fragmentary front view of the freezer, illustrating the discharge control gate for dispensing the ice cream.

Figure 3 is a fragmentary enlarged detail view of the locking mechanism for controlling the rotation of the paddle, parts broken away for convenience and illustration.

Figure 4 is a fragmentary enlarged detail of the automatic control mechanism for engaging the locking mechanism for rotating the paddle while mixing the ice cream.

Figure 5 is a fragmentary enlarged side view of the freezer illustrating the mechanism for controlling the opening and closing of the discharge gate.

Figure 6 is a fragmentary plan view of the automatic control mechanism.

Figure 7 is another preferred form of automatically controlling the swell in the mixing and freezing of ice cream. In this figure I illustrate the chamber where the swelling takes place to operate the diaphragm, I also show the solenoid for operating the plunger for controlling the paddles and a diagrammatical wiring connection between the two.

Referring to the drawings:

In the accompanying drawings I have illustrated a freezer of the continuous type, wherein the mix is introduced into the freezer as the product is drawn off. The continuous type of freezer is commonly used wherein customers are served over the counter and the product is drawn off as served.

I have a co-pending application, Serial Number 586,967, filed April 6, 1945, which has now matured into Patent No. 2,508,435, granted May 23, 1950, on a freezer of the continuous type wherein I am claiming the introduction of the mix as the product is being drawn off, and in this application I have illustrated parts of the pending application sufficient to carry out the objects of this particular invention.

1 indicates the freezer unit, having a shaft 2 driven by a drive not here shown. This shaft is journalled in the rear of the mixing chamber 1 by any suitable bearing and stuffing box 2A. The opposite end of this shaft is journalled within the bearing 3 located in the front or head 4 of the freezer. Fixedly mounted to the shaft are arms 5, having scraper bars 6 mounted thereon in the usual manner. The scraper bars travel continuously preventing the ice cream from freezing to the inner walls of the mixer.

Rotatably mounted upon the shaft 2 between the arms 5 is a hollow tube 7, which has the paddles 8 fixedly mounted thereon. The paddles 8 whip and swell the ice cream while turning and as the ice cream swells it enters the chamber 9. The chamber 9 has a diaphragm 10 across its upper opening, which is held in place by the threaded bushings 11. The bushing 11 is threaded to the upper end of the chamber 9 on its inner thread and has threads on its outer edge for receiving the cap 12. The cap 12 has an arm 13 pivotally mounted at 14 on its inner side and resting on the diaphragm 10 at 15. A switch 16 is mounted on the cap, having its operating plunger 17 extending down through the top of the cap.

When a pressure is developed within the chamber 9 by the over-run or swell due to the agitation of the paddle, the diaphragm 10 is raised raising the bar 13 against the plunger 17 of the switch 16 operating the same, which will be further described later. The bushing 11 holds the diaphragm tightly in place and at the same time its outer threads allows the cap 12 to be adjusted up and down changing the clearance between the bar 13 and the diaphragm 10 requiring a greater or less pressure to operate the switch 16, thereby changing the consistency of the cream. The shaft 2 revolves continuously within the hollow tubular shaft 7, which only revolves when it is desired to whip the product within the freezer. The tubular shaft 7 is rotated by the shaft 2 in the following manner.

A plunger rod 18 is secured to the core 19 of the solenoid 20 at its outer end, its inner end engages the spring like keys 21 which are fixedly mounted within the shaft 2 at 21A and registers with the slots 22 of the said shaft. When the plunger 18 is forced between the keys, as illustrated in Figure 3, they will force the keys out through the slot 22 and into the keyways 23 within the tubular shaft 7, locking the shaft 2 with the shaft 7 and thereby rotating the paddles 8. When the paddles have been revolved sufficiently to cause the mix or frozen product to over-run or swell within the chamber 9 the diaphragm as heretofore described, will cause the switch 16 to operate closing an electric circuit through the solenoid 20, which will pull the plunger 18 away from the keys 21 as shown in Figure 1, allowing the keys to disengage from the keyways 23 of the tube 7, thereby stopping the paddles from operating and the mix from over-running or swelling further.

I will now describe the manner in which the paddles are caused to revolve in order to start mixing or swelling the product due to the paddles, after some of the product has been withdrawn from the freezer. The product is withdrawn from the freezer through the usual port 24 having a gate 24A for closing the port 24. The gate 24A is pivotally mounted at 24B and is operated by the connecting rod 25, which is pivotally connected to the arm 26, the said arm 26 is keyed to the shaft 27 and is operated therefrom.

The shaft 27 is operated by the crank 27', link 27'' and the push rod 27'''. The push rod 27''' is operated by a means not here shown. As the shaft and the arm 26 are operated a ratchet wheel 28, rotatably mounted to the shaft 27, is rotated about the shaft by the ratchet arm 29, which is keyed to the shaft at 29'. The ratchet arm carries a ratchet 30 which moves the ratchet wheel 28 about the shaft against the spring 30'. The amount of movement of the ratchet wheel 28 is determined by the shield 31, which rides under the ratchet holding it out of engagement with the teeth of the ratchet wheel the desired length of time. The position of the shield 31 is controlled by the crank arm 32 and the push rod 33, which is manually set to determine the time that the ratchet will be held out of engagement with the ratchet wheel before turning the wheel. The object and purpose of holding the ratchet 30 out of engagement with the ratchet wheel 28 by the manually adjustable shield 31 is to determine the number of individual servings to the customers over the counter before the whipping or swelling paddles are started for bringing the over-run or swell to its highest level after this over-run has been reduced in serving. The adjustment will depend upon the operating conditions encountered.

The arm 34 is fixed to the ratchet wheel 28 and as the wheel revolves this arm engages the end 35 of the bell crank 36. The bell crank 36 is pivotally mounted at 37, the opposite end of the bell crank engaging the plunger 18 at 38. As the arm 34 operates the bell crank the bell crank will force the plunger 18 between the keys 21 expanding them as heretofore described. The length of time it takes to operate the bell crank 36 depends upon the setting of the push rod 33 and the number of times the gate 24A is opened dispensing the product. This length of time is determined also by the product itself and on the operating conditions of the freezer.

As long as the plunger 18 is being held into engagement with the key 21 by the bell crank 36 the end 35 of the bell crank will hold the pawl 39 out of engagement with the ratchet wheel 28, therefore any operation of the gate 24A will rotate the ratchet wheel each time the gate is operated but the pawl 39 will allow the wheel to return to its starting position by the spring 30' until the swell has energized the magnet 20 by the action of the diaphragm 10, at which time the bell crank 36 will allow the pawl 39 to again engage the ratchet wheel holding it in each progressed position until the arm 34 operates the bell crank 36 as above described.

I will now describe the operation of my continuous operating freezer where the frozen product is being dispensed over the counter to the trade. When the means, not here shown for operating the push rod 27''' is operated by the attendant it will raise the rod upwardly against the spring 40, raising the link 27'', operating the arm 27', the shaft 27 and the arm 26, connecting link 25, which pivots the gate 24A about its pivot point 24B and opening the port 24 for dispensing the frozen product; additional mix will be introduced into the mixing chamber 1 as the frozen product is drawn off. This is accomplished in the following manner. As the push rod 27''' was raised to open the gate 24A its upper end 41 contacted the arm 42 revolving the shaft 43 and rocking the arm 44 in the direction of the arrow, pushing the rod 45 against the plunger 46, which operates a valve mechanism 47, allowing the mix to flow from a tank 48 into the freezer 1 at 49 in a measured amount. The principle of which is fully covered in my pending application Serial Number 586,967.

When the mix enters the freezing chamber it displaces about half the amount in volume of the product that has been drawn off. After a number of withdrawals have been made and the ratchet wheel mechanism has been operated a predetermined number of times the paddles 8 will be started as described above, and the new mix will be brought to the desired over-run or swell, at which time the diaphragm 10 will operate the switch 16 and the solenoid 20 will be energized stopping the whipping paddles 8 from operation. From this description it can be readily understood that the proper over-run can be maintained at all times in this continuous mixer due to the fact that fresh mix is being introduced as the product is being drawn off.

I will now describe the operation of a batch mixer. When the mix has been introduced into the mixer in a measured quantity and the whipping paddles 8 operate until the over-run or swelling operates the diaphragm 10, it will disengage the whipping paddles from their drive and stopping them and the product then can be drawn off completely without the use of the ratchet mechanism, as it is not desired with the batch mix to restart the whipping paddles 8.

I have described an over-run and swell control for a continuous operating freezer wherein the whipping or paddling operation is resumed after a predetermined amount of frozen cream has been withdrawn from the freezer, the number of withdrawals being controlled by a ratchet mechanism operated from the dispensing gate of the freezer, the setting of which depends upon operating conditions, the operation of the control being governed by a manual setting device as above described controlling the operation of the ratchet mechanism, the control being determined over a period of operating time and the primary object of this ratchet control mechanism is to prevent too many operations of the control of the whipping or paddling element which might develop into undesirable pulsating effects.

I will now describe a method of controlling the over-run or swell wherein the swelling of the product will operate a pressure diaphragm causing a solenoid to stop the operation of the whipping or paddling unit and throwing the paddling unit into operation directly on the reduction of the over-run or swell pressures within the freezer. This may be the method that will be adopted in the operation of my invention generally, but as stated above it was believed that this operation might take place too rapidly if not controlled by a mechanism similar to the ratchet operating device as above described.

In my alternate method of controlling the over-run and swell of the ice cream a differentially wound set of solenoids 40' and 41 control the operation of the plunger rod 18 in both directions so that the paddles 8 may be started and stopped by the action of the solenoids 40' and 41 in the following manner.

The cap 12 and the switch 16 are displaced and a cap 42 is substituted therefor. The cap 42 is threadably mounted to the chamber 9 at 43. A diaphragm 44 is seated within the cap at 45 and maintained therein by the locking nut 46. A movable plunger 47 is slidably mounted within the guide 48 at its upper end and is operated by the diaphragm 44 at 49 at its lower end. Fixedly secured to the plunger 47 is a switch bar 50 normally resting on the contact bar 51 at 52. The contact bar 53 is fixedly secured to a bracket at 54 and its position is predetermined by the adjusting screw 55. The object of which will be described later.

In the operation of this control, when the swell within the chamber takes place the diaphragm 44 will be raised due to this pressure, thereby raising the plunger 47 causing the switch bar 50 to engage the contact bar 53, closing an electric circuit through the conductor 56 into the solenoid 41 and to the source of supply 57. When the solenoid 41 is energized it will pull the core 58 to the right disengaging the plunger 18 from the keys 21 stopping the paddles 8 from revolving.

When the swell is reduced by either standing for a period of time or by drawing off the product the diaphragm 44 will assume the position shown in Figure 7, breaking the contact 53 and making contact with the bar 51 closing an electric circuit through the conductor 59 into the solenoid 40' pulling the core 58 to the position shown and engaging the keys 21 by the plunger 18 with the keyways 23, causing the paddles 8 to revolve creating another swell, repeating the cycle of operation. The adjusting screw 55 is provided for giving an adjustment between the starting and stopping of the paddles.

I do not wish to be limited to the exact mechanical elements as illustrated, as other equivalents may be substituted still carrying out the objects of my invention.

What I claim as new is:

1. An ice cream machine including a freezing container having a delivery outlet, means in the container for aerating the ice cream, means controlled by a predetermined condition of the ice cream for automatically interrupting the aeration of the ice cream, means for selectively controlling the delivery of the ice cream through the outlet, and means operated by said delivery controlling means for restoring the operation of the aerating means.

2. A construction as defined in claim 1, whereby the restoring operation of the aerating means is responsive to a selected number of operations of the means for controlling the delivery of the ice cream through the outlet.

3. A construction as defined in claim 1 wherein the means for controlling the delivery of the ice cream through the outlet includes a shaft operatively connected with an outlet controlling gate, means for reversibly rotating said shaft to open and close the gate, and means progressively operated by the gate closing movements of the shaft for selectively operating said means for restoring operation of the aerating means.

4. A construction as defined in claim 1, wherein the means for controlling the delivery of ice-cream through the outlet includes a gate, a shaft connected to the gate to be operated in one direction to open the gate and in the opposite direction to close the gate, a ratchet wheel mounted loosely on the shaft, means operated by the shaft for moving the ratchet wheel a selected distance, and means responsive to a selected movement of the ratchet wheel for operating the means for restoring the operation of the aeration means in the container.

5. A construction as defined in claim 1, wherein the means for controlling the delivery of ice cream through the outlet includes a gate, a shaft connected to the gate to be operated in one direction to open the gate and in the opposite direction to close the gate, a ratchet wheel mounted loosely on the shaft, means operated by the shaft for moving the ratchet wheel a selected distance, means for manually controlling the extent of movement of the ratchet wheel following any one operation of the means for controlling the delivery outlet, and means responsive to a selected movement of the ratchet wheel for operating the means for restoring the operation of the aeration means in the container.

6. In an ice cream machine, a freezing container having a gate controlled outlet, means in the container for aerating ice cream, means controlled by a predetermined condition of swell of the aerated ice cream, for interrupting the operation of the aeration means, means for selectively controlling the gate of the container, and means responsive to a selected number of operations of the gate controlling means for restoring the operation of the aeration means in the container.

7. A construction as defined in claim 6, wherein the means for restoring the operation of the aeration means includes a control lever, and the means for selectively controlling the gate includes a shaft connected to the outlet gate and moved in one direction on opening of the gate, a ratchet wheel loosely mounted on said shaft and responsive to the means for controlling the operation of the gate, and an element on the ratchet for engaging and operating said control lever following a predetermined movement of the ratchet.

8. A construction as defined in claim 6, wherein the means for restoring the aeration means in the container includes a shaft connected to the outlet gate and moved in one direction on opening of the gate, a ratchet wheel loosely mounted on the said shaft and responsive to the means for controlling the operation of the gate, a control lever, an element on the ratchet for engaging and operating said control lever following a predetermined movement of the ratchet, and manually adjustable means for selectively controlling the extent of ratchet operation by each operation of the gate controlling means.

9. An ice cream machine, including a freezing container, an aeration means within the container, a shaft for carrying the aeration means, a driving means for said shaft, means for connecting the driving means and shaft for operating the aeration means, independent means, including a solenoid, for disconnecting the connecting means to interrupt operation of the aerating means, a switch for energizing the solenoid, and means open to the container and to the material therein for operating the switch.

10. A construction as defined in claim 9, wherein the container is provided with an outlet, and wherein mechanical means are provided for opening the outlet, and means responsive to successive operation of the mechanical means to finally operate the connecting means to inaugurate operation of the aeration means.

11. A construction as defined in claim 9, wherein the container is provided with an outlet, and wherein mechanical means are provided for opening the outlet, and means responsive to successive operation of the mechanical means to finally operate the connecting means to inaugurate operation of the aeration means, and manually adjustable means controlling said connection operating means for effecting operation thereof after a selected number of operations of said mechanical means.

12. An ice-cream making and dispensing machine comprising a refrigerated container, paddles in the container for aerating ice-cream, driving means in said container, movable connector means between said paddles and said driving means, a solenoid operable to move said connector means to disconnect said paddles from said driving means to interrupt the aeration of the ice-cream, means responsive to a predetermined aerated condition of the ice-cream in the container for operating said solenoid, means for delivering ice-cream from the container, and mechanism operated in the operation of the delivery means for moving said connector means to connect said paddles with said driving means.

13. An ice-cream making and dispensing machine comprising a refrigerated container, a drive shaft in said container, paddles in the container for aerating ice-cream, a shaft carrying said paddles and mounted on said drive shaft, movable connector means between said shafts, a solenoid operable to move said connector means to disconnect said shafts and interrupt the aeration of the ice-cream, a normally open switch controlling said solenoid, means open to the container and responsive to a predetermined aerated condition of the ice-cream in the container for operating said switch, means for delivering ice-cream from the container, and means operated in the operation of the delivery means for moving said connector means to connect said shafts.

14. A construction as defined in claim 13 wherein said connector means includes connecting means on the drive shaft for connecting said shaft with the paddle shaft but normally free from the paddle shaft, and a movable rod for operating said means to interlock the drive shaft and the paddle shaft and operatively connected to both said solenoid and said means for moving said connecting means to connect said shafts.

15. A construction as defined in claim 13 wherein said switch is adjustable relative to said switch operating means to selectively vary conditions under which it is operated.

16. A construction as defined in claim 13 wherein said switch is double acting and said means for moving said connecting means to connect said shafts includes a second solenoid operatively connected to said switch.

17. An ice-cream making and dispensing machine comprising a refrigerated container, a constantly driven shaft in said container, paddles in the container for aerating ice-cream, a sleeve shaft carrying said paddles and mounted around said driven shaft, keyways in said sleeve shaft, key elements carried by said driven shaft and movable radially between positions beyond said shaft and in said keyways for driving said sleeve shaft and normally within the periphery of said driven shaft to free said sleeve shaft, a rod movable longitudinally within said driven shaft for biasing said key elements outwardly of said shaft, a solenoid operable to withdraw said rod from said key elements to free said shafts and interrupt the aeration of the ice-cream, a normally open switch controlling said solenoid, means in communication with the container and responsive to a predetermined aerated condition of the ice-cream in the container for operating said switch, means for delivering ice-cream from the container, and means operated in the operation of the delivery means for moving said rod to bias said key elements outwardly and connect said shafts for initiating the operation of the paddles within the container.

ANDREW J. TACCHELLA.

REFERENCES CITED

The following references are of record in the file of this patent:

UNITED STATES PATENTS

| Number | Name | Date |
|---|---|---|
| 1,609,915 | Parker | Dec. 7, 1926 |
| 1,699,170 | Turnbow | Jan. 15, 1929 |
| 1,951,365 | Morrow | Mar. 20, 1934 |
| 2,125,693 | Ralph | Aug. 2, 1938 |
| 2,272,614 | Reinken et al. | Feb. 10, 1942 |